(12) United States Patent
Spangler et al.

(10) Patent No.: US 10,746,033 B2
(45) Date of Patent: Aug. 18, 2020

(54) GAS TURBINE ENGINE COMPONENT

(71) Applicant: United Technologies Corporation, Farmington, CT (US)

(72) Inventors: Brandon W. Spangler, Vernon, CT (US); Jose R. Paulino, Saco, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 62 days.

(21) Appl. No.: 15/982,396

(22) Filed: May 17, 2018

(65) Prior Publication Data

US 2019/0040753 A1 Feb. 7, 2019

Related U.S. Application Data

(60) Provisional application No. 62/540,285, filed on Aug. 2, 2017.

(51) Int. Cl.
| | |
|---|---|
| *F01D 9/04* | (2006.01) |
| *F01D 25/12* | (2006.01) |
| *F01D 5/18* | (2006.01) |
| *F01D 11/00* | (2006.01) |

(52) U.S. Cl.
CPC ............ *F01D 9/041* (2013.01); *F01D 5/187* (2013.01); *F01D 11/001* (2013.01); *F01D 25/12* (2013.01); *F05D 2240/55* (2013.01); *F05D 2240/81* (2013.01); *F05D 2260/20* (2013.01)

(58) Field of Classification Search
CPC ...... F01D 5/143; F01D 9/041; F05D 2240/81; F05D 2240/80
See application file for complete search history.

(56) References Cited

U.S. PATENT DOCUMENTS

| 3,628,880 | A | * | 12/1971 | Smuland | ................. | F01D 5/189 |
| | | | | | | 415/175 |
| 4,012,167 | A | * | 3/1977 | Noble | ..................... | F01D 5/187 |
| | | | | | | 416/97 A |
| 4,693,667 | A | * | 9/1987 | Lenz | ....................... | F01D 5/189 |
| | | | | | | 415/115 |
| 4,712,979 | A | * | 12/1987 | Finger | .................... | F01D 5/081 |
| | | | | | | 415/115 |

(Continued)

FOREIGN PATENT DOCUMENTS

| EP | 2927430 | 10/2015 |
| EP | 3192971 | 7/2017 |
| WO | 02092970 | 11/2002 |

OTHER PUBLICATIONS

EP Search Report for European Application No. 18173003.7 dated Jan. 31, 2019.

*Primary Examiner* — David E Sosnowski
*Assistant Examiner* — Maranatha Boardman
(74) *Attorney, Agent, or Firm* — Carlson, Gaskey & Olds, P.C.

(57) ABSTRACT

A component for a gas turbine engine includes at least one airfoil that has a radially inner end and a radially outer end. A platform includes a radially outer surface that is attached to the radially inner end of the airfoil. A radially inner side of the platform includes a forward surface and an aft surface. A pocket is recessed into at least one of the forward surface and the aft surface. A cover plate covers the pocket and a seal is attached to the cover plate.

19 Claims, 4 Drawing Sheets

(56) References Cited

U.S. PATENT DOCUMENTS

| | | | | |
|---|---|---|---|---|
| 5,344,283 | A | * | 9/1994 | Magowan ............... F01D 5/187 |
| | | | | 415/115 |
| 6,769,865 | B2 | | 8/2004 | Kress et al. |
| 8,961,134 | B2 | * | 2/2015 | Beeck ..................... F01D 5/143 |
| | | | | 416/193 A |
| 9,011,078 | B2 | | 4/2015 | Winn et al. |
| 9,441,497 | B2 | | 9/2016 | Bergman et al. |
| 2006/0269409 | A1 | | 11/2006 | Torii et al. |
| 2009/0238683 | A1 | * | 9/2009 | Alvanos ............... F01D 11/001 |
| | | | | 415/173.7 |
| 2016/0186579 | A1 | * | 6/2016 | Suciu ................... B23K 35/325 |
| | | | | 415/200 |
| 2017/0101878 | A1 | * | 4/2017 | Wang ..................... F01D 9/041 |

* cited by examiner

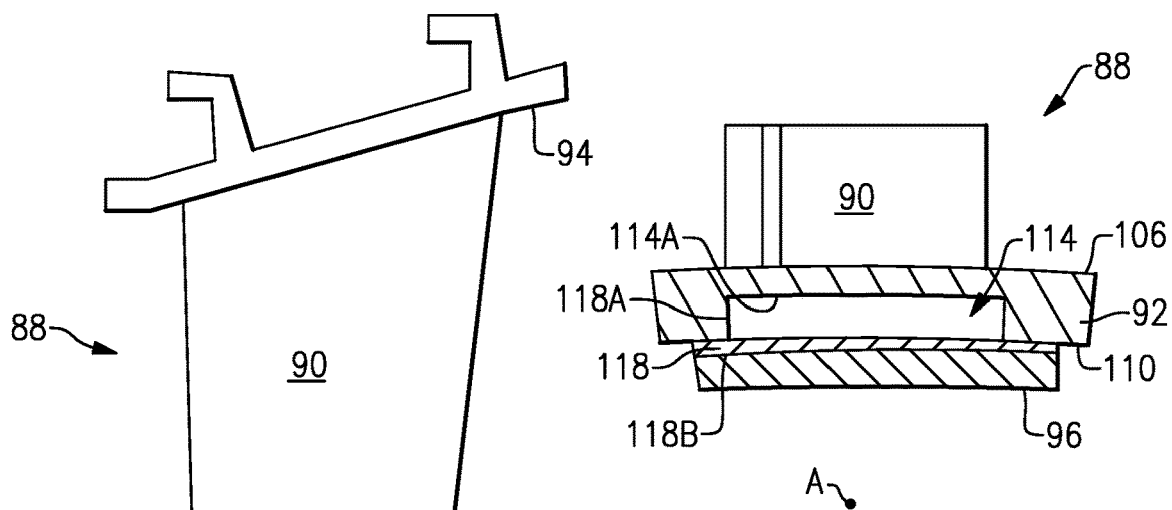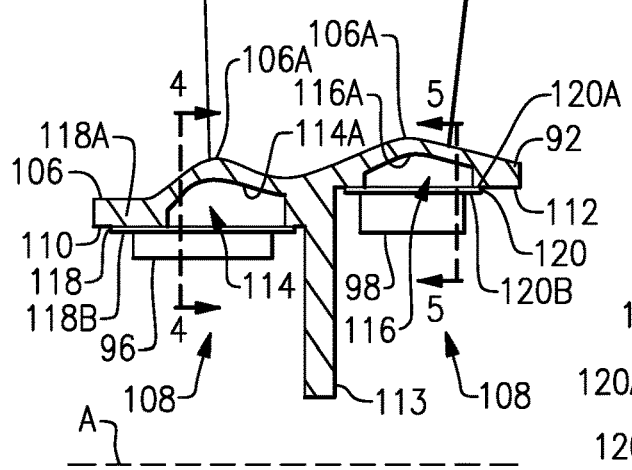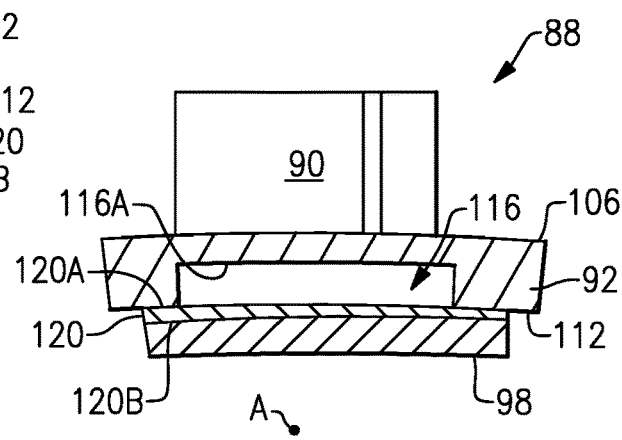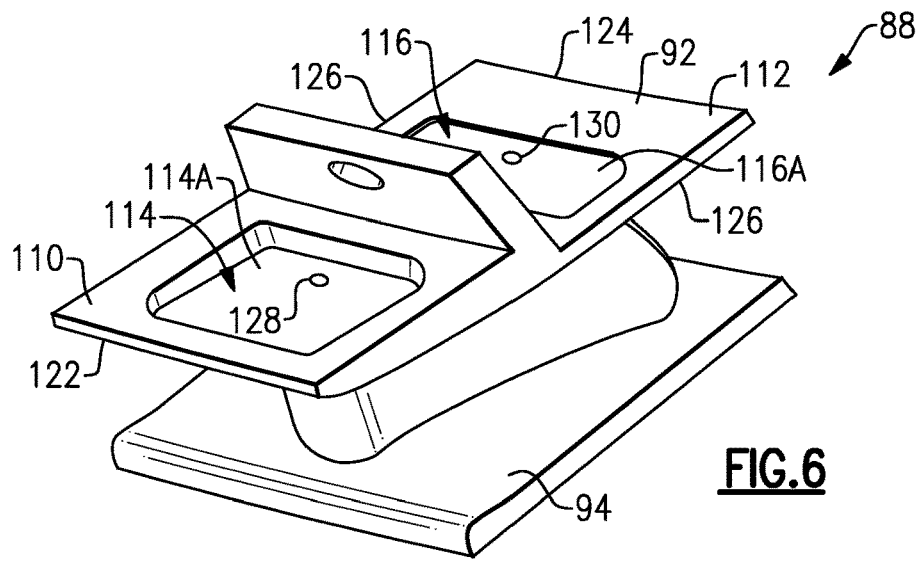

GAS TURBINE ENGINE COMPONENT

CROSS-REFERENCE TO RELATED APPLICATIONS

This application claims priority to U.S. Provisional Application No. 62/540,285, which was filed on Aug. 2, 2017 and is incorporated herein by reference.

STATEMENT REGARDING FEDERALLY SPONSORED RESEARCH OR DEVELOPMENT

This invention was made with government support under Contract No. W58RGZ-16-C-0046, awarded by the United States Army. The Government has certain rights in this invention.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Due to the desire to increase the efficiency of gas turbine engines, operating temperatures of the gas turbine engine have increased. With the increase in operating temperature, there is a need to design components, such as blades and vanes that are better suited to withstand the elevated operating temperatures.

SUMMARY

In one exemplary embodiment, a component for a gas turbine engine includes at least one airfoil that has a radially inner end and a radially outer end. A platform includes a radially outer surface that is attached to the radially inner end of the airfoil. A radially inner side of the platform includes a forward surface and an aft surface. A pocket is recessed into at least one of the forward surface and the aft surface. A cover plate covers the pocket and a seal is attached to the cover plate.

In a further embodiment of any of the above, the forward surface includes a first radial position and the aft surface includes a second radial position different from the first radial position.

In a further embodiment of any of the above, the forward surface is spaced from the aft surface by a radially extending flange.

In a further embodiment of any of the above, the platform includes a leading edge, a trailing edge and a pair of circumferential edges. The pocket is spaced inward from the leading edge, the trailing edge and the pair of circumferential edges.

In a further embodiment of any of the above, a second pocket is recessed into the other of the at least one of the forward surface and the aft surface.

In a further embodiment of any of the above, a second cover plate covering the second pocket. A second seal is attached to the second cover plate.

In a further embodiment of any of the above, the pocket is in fluid communication with a first internal cooling passage in at least one airfoil.

In a further embodiment of any of the above, at least one airfoil includes a plurality of airfoils and the platform forms a continuous loop.

In a further embodiment of any of the above, the pocket is circumferentially aligned with more than one of the plurality of airfoils.

In another exemplary embodiment, a gas turbine engine section includes a first rotor section. A stator is adjacent the first rotor section. The stator includes at least one airfoil that has a radially inner end and a radially outer end. A platform includes a radially outer surface attached to the radially inner end of the airfoil. A radially inner side of the platform includes a forward surface and an aft surface. A pocket is recessed into at least one of the forward surface and the aft surface. A cover plate covering the pocket. A seal is attached to the cover plate.

In a further embodiment of any of the above, the forward surface includes a first radial position. The aft surface includes a second radial position different from the first radial position.

In a further embodiment of any of the above, the forward surface is spaced from the aft surface by a radially extending flange.

In a further embodiment of any of the above, the platform includes a leading edge, a trailing edge and a pair of circumferential edges. The pocket is spaced from the leading edge, the trailing edge and the pair of circumferential edges.

In a further embodiment of any of the above, a second pocket is recessed into the other of the at least one of the forward surface and the aft surface. A second cover plate covers the second pocket. A second seal is attached to the second cover plate.

In a further embodiment of any of the above, a first cover plate is attached to the first rotor section and includes at least one knife edge seal forming a seal with the first seal. A second cover plate is attached to a second rotor section and includes at least one knife edge seal forming a seal with the second seal. The stator separates the first rotor section and the second rotor section.

In a further embodiment of any of the above, the pocket is in fluid communication with a first internal cooling passage in the at least one airfoil.

In a further embodiment of any of the above, at least one airfoil includes a plurality of airfoils and the platform forms a continuous loop.

In another exemplary embodiment, a method of forming a vane includes the steps of forming an airfoil. A platform is formed that has a radially inner surface and a radially outer surface. The radially outer surface is connected to the airfoil and the radially inner surface includes a forward surface and an aft surface. A pocket is formed in at least one of the forward surface and the aft surface. The pocket is covered with a cover plate and a seal is attached on the cover plate.

In a further embodiment of any of the above, the forward surface and the aft surface are spaced from each other in a radial direction.

In a further embodiment of any of the above, a second pocket is formed in the other of the forward surface and aft surface. The second pocket is covered with a second cover plate. A second seal is formed on the second cover plate.

BRIEF DESCRIPTION OF THE DRAWINGS

FIG. 3 is a cross-sectional view of an example vane.

FIG. 4 is a cross-sectional view taken along line 4-4 of FIG. 3.

FIG. 5 is a cross-sectional view taken along line 5-5 of FIG. 3.

FIG. 6 is a perspective view of the vane of FIG. 3.

DETAILED DESCRIPTION

Figure 1:
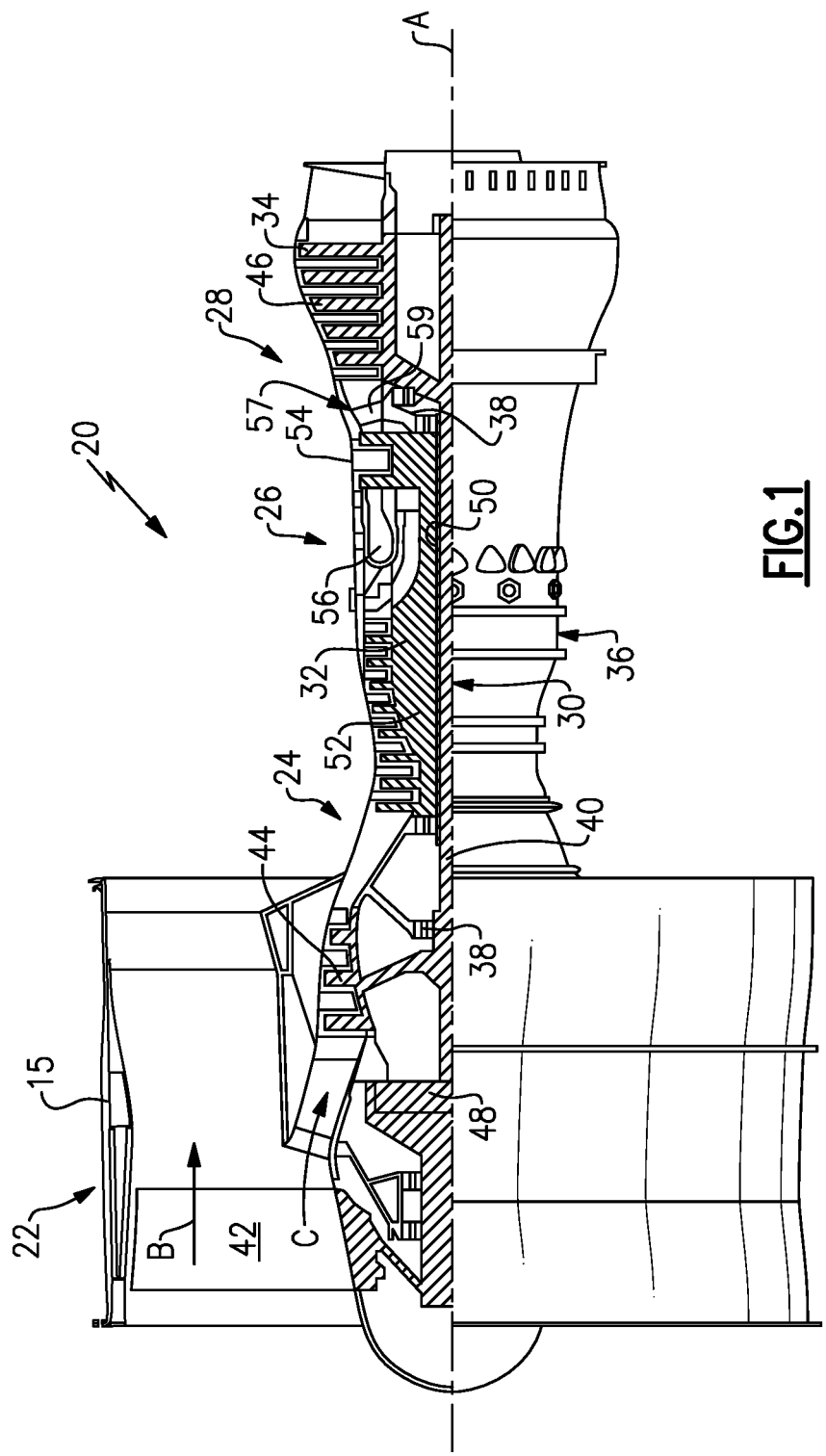
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7 °R)]^{0.5}$. The "Low corrected fan tip speed" as disclosed herein according to one non-limiting embodiment is less than about 1150 ft/second (350.5 meters/second).

Figure 2:
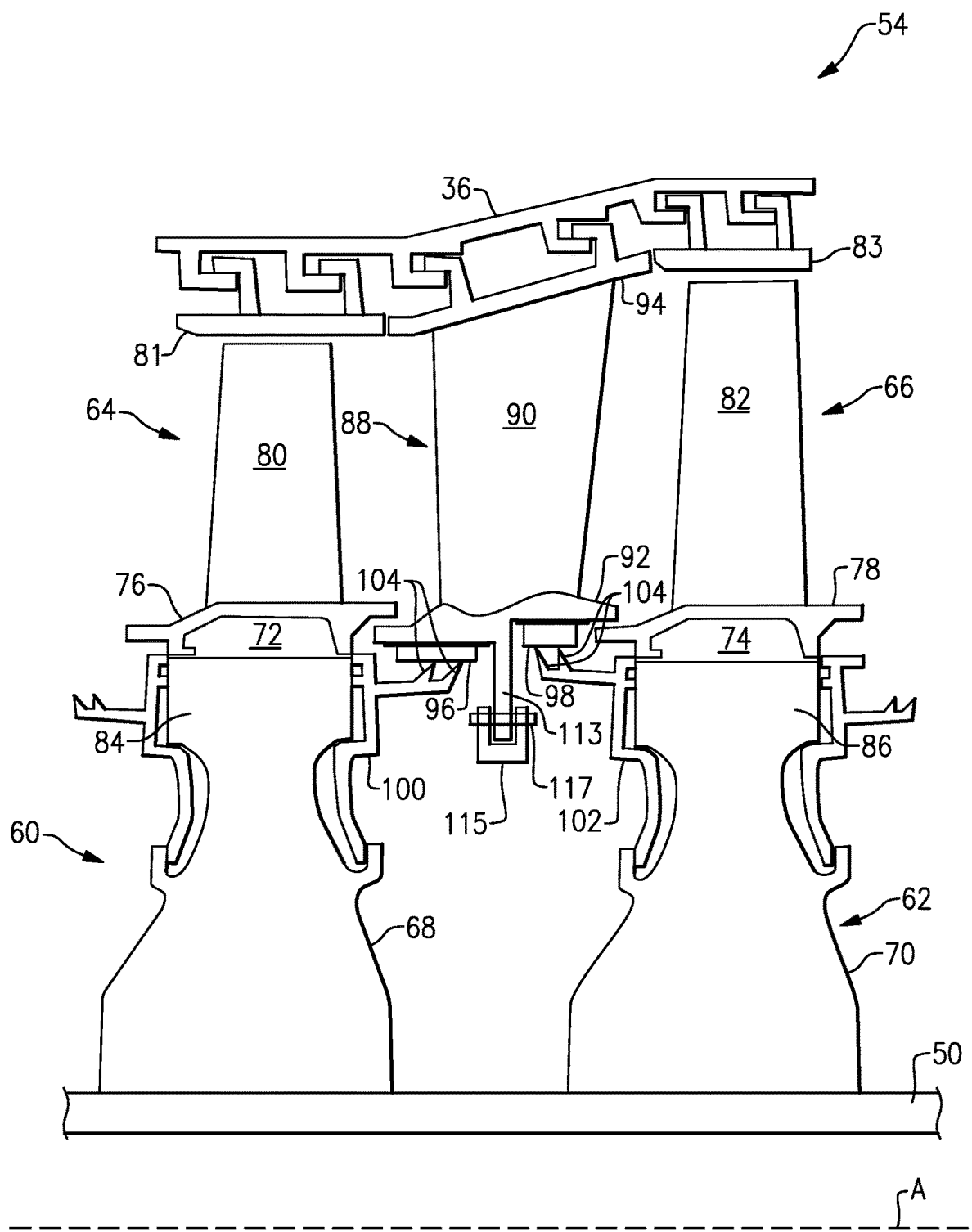
FIG. 2 is a schematic view of an example gas turbine engine section.

FIG. 2 illustrates an enlarged schematic view of the high pressure turbine 54, however, other sections of the gas turbine engine 20 could benefit from this disclosure, such as the low pressure turbine 46 or the high pressure compressor 52. In the illustrated non-limiting embodiment, the high pressure turbine 54 includes a two-stage turbine section with a first rotor assembly 60 and a second rotor assembly 62. The first rotor assembly 60 and the second rotor assembly 62 are attached to and rotate with the outer shaft 50.

The first rotor assembly 60 includes a first plurality of rotor blades 64 circumferentially spaced around a first disk 68 forming a first array of blades. The second rotor assembly 62 includes a second plurality of rotor blades 66 circumferentially spaced around a second disk 70 forming a second array of blades. Each of the first and second plurality of rotor blades 64, 66 include a respective first root portion 72 and a second root portion 74, a first platform 76 and a second platform 78, and a first airfoil 80 and a second airfoil 82. Each of the first and second root portions 72, 74 is received within a first rim and a second rim 84, 86 of the first and second disk 68, 70, respectively. The first airfoil 80 and the second airfoil 82 extend radially outward toward an unshrouded end adjacent a first and second blade outer air seal (BOAS) 81, 83, respectively.

The first and second plurality of rotor blades 64, 66 are disposed in the core flow path that is pressurized in the compressor section 24 then heated to a working temperature in the combustor section 26. The first and second platforms 76, 78 separate a gas path side inclusive of the first and second airfoils 80, 82 and a non-gas path side inclusive of the first and second root portions 72, 74, respectively.

A plurality of vanes 88 each include at least one airfoil 90 that extends between a respective inner platform 92 and an outer platform 94. In the illustrated example, the plurality of vanes form a stator. The outer platform 94 may be supported by the engine case structure 36 and the inner platform 92 supports a first and second abradable annular seal 96 and 98, such as honeycomb seals.

A first rotor assembly aft plate 100 is attached to the first disk 68 to form a seal with the first abradable annular seal 96 and a second rotor assembly forward plate 102 is attached to the second disk 70 to form a seal with the second abradable annual seal 98. In the illustrated non-limiting embodiment, the first rotor assembly aft plate 100 and the second rotor assembly forward plate 102 each include a pair of knife edge seals 104 that engage a respective one of the first and second abradable annular seals 96, 98. The first rotor assembly aft plate 100 and the second rotor assembly forward plate 102 are configured to rotate with a respective first and second disk 68, 70.

A flange 113 extends radially inward from the inner platform 92. The flange 113 also extends in a circumferential direction and supports a full hoop inner air seal 115. The full hoop inner air seal 115 is attached to the flange 113 by a plurality of fasteners 117 extending through the full hoop inner air seal 115 and the flange 113.

Although FIG. 2 illustrates the first rotor section 60 and the second rotor section 62 separated by the plurality of vanes 88, the plurality of vanes could be located adjacent only a single rotor section.

FIG. 3 illustrates a cross-sectional view through the inner platform 92 of one of the vanes 88. The inner platform 92 includes a radially outer surface 106 that partially defines the hot gas flow path. The radially outer surface 106 includes a radial dimension that varies in the axial direction such that the radially outer surface 106 is not flat or cylindrical. In the illustrated non-limiting embodiment, an axially forward end of the radially outer surface 106 is spaced inward from an axially downstream end of the radially outer surface 106 and includes at least one undulation 106A forming a peak in the radially outer surface 106. In this disclosure, forward, aft, axial, or axially is in relation to the engine axis A unless stated otherwise.

A radially inner side 108 of the inner platform 92 includes an axially forward surface 110 and an axially aft surface 112 separated by the flange 113. In the illustrated non-limiting embodiment, the forward surface 110 is spaced a first radial distance from the engine axis A and the aft surface 112 is spaced a second radial distance from the engine axis A greater than the first distance. In this disclosure, radial or radially is with respect to the engine axis A unless stated otherwise.

A forward pocket 114 having a forward pocket wall 114A is recessed into forward surface 110 and an aft pocket 116 having an aft pocket wall 116A is recessed into the aft surface 112. In the illustrated non-limiting embodiment, the forward surface 110 is maintained at a constant first radial distance surrounding the forward pocket 114. Also, the aft surface 112 is maintained at a constant second radial distance surrounding the aft pocket 116.

A portion of the forward pocket wall 114A closely follows a profile of the radially outer surface 106 to maintain a generally constant thickness of the inner platform 92. Similarly, a portion of the aft pocket wall 116A closely follows a profile of the radially outer surface 106 to maintain a generally constant thickness of the inner platform 92. In one non-limiting embodiment, a thickness of the inner platform 92 between the radially outer surface 106 and the portion of the forward pocket wall 114A does not exceed 200% of a thickness of a leading edge of the inner platform 92. By maintaining a generally constant thickness of the inner platform 92, variations in thermal expansion due to varying mass are reduced which reduces the thermal mechanical fatigue during heating and cooling cycles. This reduction in thermal mechanical fatigue extends the operating life of the vane 88.

Figure 7:
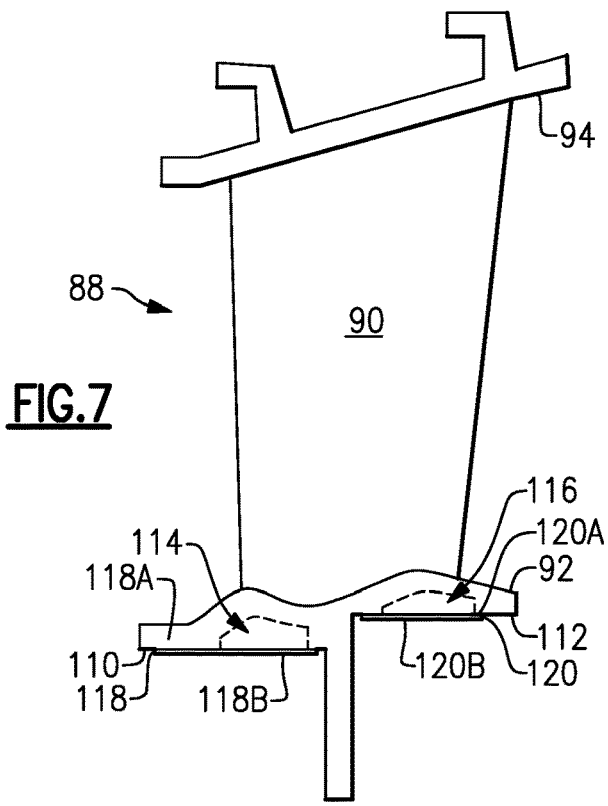
FIG. 7 illustrates a partially assembled vane from FIG. 3.

The forward pocket 114 is enclosed or covered by a forward cover plate 118 such that the forward pocket 114 is entirely enclosed by the forward pocket wall 114A and the forward cover plate 118. The forward cover plate 118 includes a radially outer surface 118A that is in contact with the forward surface 110 and a radially inner surface 118B that contacts the first abradable seal 96. The forward cover plate 118 is attached to the forward surface 110 through welding, brazing, or bonding as shown in FIG. 7. The first abradable seal 96 is attached to the forward cover plate 118 through welding, brazing, or bonding. Alternatively, the first abradable seal 96 could be attached to the forward cover plate 118 prior to attaching the forward cover plate 118 to the forward surface 110.

The aft pocket 116 is enclosed or covered by an aft cover plate 120 such that the aft pocket 116 is entirely enclosed by the aft pocket wall 116A and the aft cover plate 120. The aft cover plate 120 includes a radially outer surface 120A that is in contact with the aft surface 112 and a radially inner surface 120B that contacts the second abradable seal 98. The aft cover plate 120 is attached to the aft surface 112 through welding, brazing, or bonding as shown in FIG. 7. Similarly, the second abradable seal 98 is attached to the aft cover plate 120 through welding, brazing, or bonding. Alternatively, the second abradable seal 98 could be attached to the aft cover plate 120 prior to attaching the aft cover plate 120 to the aft surface 112.

As shown in FIGS. 4 and 5, the forward and aft cover plates 118, 120 and the first and second abradable seals 96, 98 extend a substantial width of the inner platform 92.

FIG. 6 illustrates a bottom perspective view of the vane 88. The inner platform 92 includes a leading edge 122, a trailing edge 124, and a pair of circumferential edges 126. The forward pocket 114 and the aft pocket 116 are spaced inward from the leading edge 122, the trailing edge 124, and the pair of circumferential edges 126. In one non-limiting embodiment, the forward pocket 114 is in fluid communication with a first internal cooling passage 128 in the vane 88 and the aft pocket 116 is in fluid communication with a second internal cooling passage 130 in the vane 88.

Figure 8:
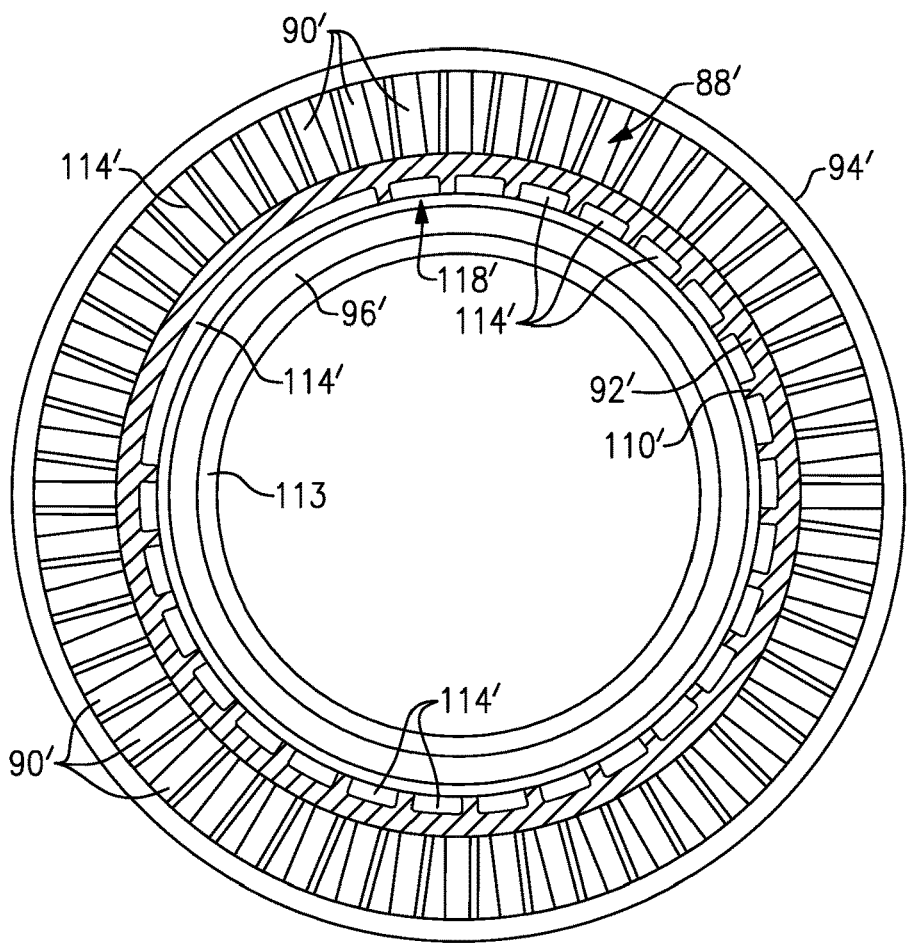
FIG. 8 illustrates an example vane hoop.

FIG. 8 illustrates a non-limiting embodiment of a vane hoop 88'. The vane hoop 88' similar to the vanes 88 described above except where described below or shown in the Figures. Instead of the vanes 88 being arranged as individual vanes or segments of multiple vanes, the vane hoop 88' includes multiple vanes formed into a complete and continuous loop that surrounds the engine axis A.

The vane hoop 88' includes airfoils 90' that extend from an inner platform 92' on a radially inner end to an outer platform 94' on a radially outer end of each of the airfoils 90'. In the illustrated non-limiting embodiment, a forward cover plate 118' attached to a forward surface 110' forms a complete and continuous loop to enclose a plurality of forward pockets 114' and a first abradable seal 96' is attached to the forward cover plate 118' and forms a complete and continuous loop. In another non-limiting embodiment, the forward cover plate 118' and the first abradable seal 96' could be segmented.

The plurality of forward pockets 114' could include a combination of smaller pockets that are only circumferentially aligned with a single airfoil 90' and larger pockets that are circumferentially aligned with multiple airfoils 90. In the illustrated embodiment, one of the forward pockets 114' extends circumferentially approximately 90 degrees.

Although only the forward pockets 114' are shown in FIG. 8, the vane hoop 88' also include aft pockets 116', an aft cover plate 120', and aft surface 112', and a second abradable seal 98' (not shown) having the same configuration as described above with respect to the forward pockets 114'.

When the vane 88 or 88' are manufactured, the airfoil 90, 90' can be formed separately from the inner and outer platforms 92, 92', 94, 94' and later attached or formed together as a single-piece component. Similarly, the forward and aft pockets 114, 114', 116, 116' can be formed when the inner platform 92, 92' is formed or formed later by another process, such as machining. Once the forward and aft pockets 114, 114', 116, 116' have been formed, the forward cover plate 118, 118' is placed on the forward surface 110, 110' enclosing the forward pockets 114, 114' and the aft cover plate 120, 120' is placed on the aft surface 112, 112' enclosing the aft pockets 116, 116', respectively. The first abradable seal 96, 96' can then be attached to the forward cover plate 118, 118' and the second abradable seal 98, 98' can be attached to the aft cover plate 120, 120', respectively.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A component for a gas turbine engine comprising:
   at least one airfoil having a radially inner end and a radially outer end;
   a platform including a radially outer surface attached to the radially inner end of the airfoil and a radially inner side of the platform includes a forward surface and an aft surface;
   a first pocket recessed into at least one of the forward surface and the aft surface;
   a first cover plate covering the pocket;
   a first seal attached to the first cover plate;
   a second pocket recessed into the other of the at least one of the forward surface and the aft surface;
   a second cover plate covering the second pocket; and
   a second seal attached to the second cover plate.

2. The component of claim 1, wherein the forward surface includes a first radial position and the aft surface includes a second radial position different from the first radial position.

3. The component of claim 1, wherein the forward surface is spaced from the aft surface by a radially extending flange.

4. The component of claim 1, wherein the platform includes a leading edge, a trailing edge, and a pair of circumferential edges and the pocket is spaced inward from the leading edge, the trailing edge, and the pair of circumferential edges.

5. The airfoil of claim 1, wherein the pocket is in fluid communication with a first internal cooling passage in the at least one airfoil.

6. The component of claim 1, wherein the at least one airfoil includes a plurality of airfoils and the platform forms a single continuous loop.

7. The component of claim 6, wherein the pocket is circumferentially aligned with more than one of the plurality of airfoils.

8. The component of claim 1, wherein the first cover plate includes a trailing edge located axially forward of a leading edge on the second cover plate.

9. A gas turbine engine section comprising:
   a first rotor section;
   a second rotor section;
   a stator separating the first rotor section from the second rotor section, the stator including:
      at least one airfoil having a radially inner end and a radially outer end;
      a platform including a radially outer surface attached to the radially inner end of the airfoil and a radially inner side of the platform includes a forward surface and an aft surface;
      a first pocket recessed into at least one of the forward surface and the aft surface;
      a first cover plate covering the first pocket;
      a first seal attached to the first cover plate;
      a second pocket recessed into the other of the at least one of the forward surface and the aft surface;
      a second cover plate covering the second pocket; and
      a second seal attached to the second cover plate.

10. The gas turbine engine section of claim 9, wherein the forward surface includes a first radial position and the aft surface includes a second radial position different from the first radial position.

11. The gas turbine engine section of claim 9, wherein the forward surface is spaced from the aft surface by a radially extending flange.

12. The gas turbine engine section of claim 9, wherein the platform includes a leading edge, a trailing edge, and a pair of circumferential edges and the first pocket is spaced from the leading edge, the trailing edge, and the pair of circumferential edges.

13. The gas turbine engine section of claim 9, wherein the first cover plate is located adjacent to the first rotor section and at least one first knife edge seal is located adjacent to the first seal and the second cover plate is located adjacent to the second rotor section and at least one second knife edge seal is located adjacent to the second seal.

14. The gas turbine engine section of claim 9, wherein the first pocket is in fluid communication with a first internal cooling passage in the at least one airfoil.

15. The gas turbine engine section of claim 9, wherein the at least one airfoil includes a plurality of airfoils and the platform forms a single continuous loop.

16. The gas turbine engine of claim 9, wherein the first cover plate includes a trailing edge located axially forward of a leading edge on the second cover plate.

17. A method of forming a vane, the method comprising the steps of:
   forming an airfoil;
   forming a platform having a radially inner surface and a radially outer surface, the radially outer surface is connected to the airfoil and the radially inner surface includes a forward surface and an aft surface;

forming a first pocket in at least one of the forward surface and the aft surface;

covering the first pocket with a first cover plate;

attaching a first seal on the first cover plate;

forming a second pocket in the other of the forward surface and aft surface;

covering the second pocket with a second cover plate; and attaching a second seal on the second cover plate.

18. The method of claim 17, wherein the forward surface and the aft surface are spaced from each other in a radial direction and separated axially from each other by a flange.

19. The method of claim 17, wherein the first cover plate includes a trailing edge located axially forward of a leading edge on the second cover plate.

* * * * *